(12) United States Patent
Burton et al.

(10) Patent No.: US 7,130,880 B1
(45) Date of Patent: Oct. 31, 2006

(54) SYSTEM AND METHOD FOR SHARING FILES VIA A USER INTERNET FILE SYSTEM

(75) Inventors: Daniel Burton, Eagle Mountain, UT (US); David Mitchell, Orem, UT (US)

(73) Assignee: Novell, Inc., Provo, UT (US)

( * ) Notice: Subject to any disclaimer, the term of this patent is extended or adjusted under 35 U.S.C. 154(b) by 1188 days.

(21) Appl. No.: 09/685,238

(22) Filed: Oct. 10, 2000

(51) Int. Cl.
*G06F 15/16* (2006.01)

(52) U.S. Cl. ................................. 709/203; 709/245

(58) Field of Classification Search ........ 709/210–253; 707/1–10, 100–104.1; 713/168–170; 711/100–173; 717/174–178
See application file for complete search history.

(56) References Cited

U.S. PATENT DOCUMENTS 6,351,776 B1 * 2/2002 O'Brien et al. ............. 709/245
6,389,589 B1 * 5/2002 Mishra et al. .............. 717/170

OTHER PUBLICATIONS

"Role-Based Access Control", David Ferraiolo and Richard Kuhn, National Institute of Standards and Technology for the Proceedings of the 15th National COmputer Security Conference, 1992.*
JustOn Files—Internet File Sharing (www.juston.com) Novell, Inc.
A Common Internet File System (CIFS) (www.thursby.com).
The Secure Shell (SSH) Frequently Asked Questions (www.employees.org).
WebDAV in 2 Minutes (www.fileangel.org).
WebDAV Resources (www.webdav.org).

* cited by examiner

*Primary Examiner*—David Wiley
*Assistant Examiner*—Arrienne M. Lezak
(74) *Attorney, Agent, or Firm*—Haynes and Boone, LLP

(57) ABSTRACT

A system and method for sharing files via an Internet file system is presented. In one embodiment, an internet file system is configured when a user accesses a server that is configured with an application that creates the internet file system for the user. A directory stores a home folder of the user, where folders and files in the home folder are available at a root of the internet file system. The application provides a first folder and a second folder in a root of the home folder. The first folder contains folders that represent folders and files that have been shared with the user, and the second folder contains objects of the user and communities that are of interest to the user. The application further creates an auxiliary class containing a first attribute, a second attribute, and a third attribute. The first attribute is used to quickly find other users that the folders and the files in the home folder have been shared with, the second attribute is used to store names of the other users and a path of the folders and the files that have been shared with the user, and the third attribute is used to allow the user and other users with common interests to share folders and files of the common interest.

29 Claims, 4 Drawing Sheets

SYSTEM AND METHOD FOR SHARING FILES VIA A USER INTERNET FILE SYSTEM

BACKGROUND

The present disclosure relates to file sharing and, more particularly, to a system and method for sharing files via an Internet file system.

Various file sharing protocols have been proposed. One such proposal includes the Common Internet File System (CIFS). The CIFS is intended to provide an open cross-platform mechanism for client systems to request file services from server systems over a network. Further, the CIFS is based on the standard Server Message Block protocol widely in use by personal computers and workstations running a variety of operating systems.

Another protocol is the Secure Shell (SSH) which is program to log into another computer over a network, to execute commands in a remote machine, and to move files from one machine to another Use of the Internet and the World Wide Web has been characterized by read-only access. Existing protocols such as FTP are good solutions for two-way file transfers. However, new read/write interfaces will become increasingly necessary as the Internet becomes more interactive and collaborative. Adoption of a common file sharing protocol for the Internet having modern semantics such as shared files, byte-range locking, coherent caching, change notification, and replicated storage, would provide important benefits to the Internet community.

Conventional file sharing services have been implemented that address some of the issues described above. In such conventional services, an Internet or Web based file server is available for Internet users to store, share, manage and publish files from their Web browser and access them from their or any other Web browser. As such, users can stay connected to their information from anywhere in the world. User files are securely stored on a network and may be shared with any colleague of the users choosing. Most file sharing services support all file types and require no additional software on the desktop making the services an extension of the desktop and a fast and easy way to share and distribute files and content on the Web.

A limitation of the conventional file sharing services is that copying files to and from an Internet file system is difficult and cumbersome. For example, most file upload systems require a special interface that users must become accustomed to, whether that interface is browser based or a special client application. A Web-based Distributed Authoring and Versioning (WebDAV) set of extensions to the Hyper Text Transfer Protocol (HTTP), however, allows users to collaboratively edit and manage files on remote web servers. Since DAV works over HTTP, all the benefits of HTTP are realized that FTP cannot provide. Such benefits include: strong authentication, encryption, proxy support, and caching. Although it is true that SSH does provide some of this functionality, the HTTP infrastructure is much more widely deployed than SSH. Further, SSH does not have the wide complement of tools, development libraries, and applications that HTTP does.

The protocols which use the services mentioned above typically use databases to store information about users and the rights of those users to certain files in a system. As such, anytime a user attempts to access a particular file, a database check will be made to determine if the user has rights to that file. Constantly using a database to allow file sharing between users can become a cumbersome exercise.

Therefore, what is needed, is an application that makes an Internet file system behave in a similar manner as a local or network file system and that administers rights for files in the file system. Also, a directory is used for user account information. Also, communities of users may be configured to allow the users to easily share folders and files containing information of common interests.

SUMMARY

In response to these limitations, a system and method for sharing files via an Internet file system is presented. In such a system, the Internet is treated as an extension of the users own file system where access rights are stored.

In one embodiment, an internet file system is configured when a user accesses a server that is configured with an application that creates the internet file system for the user. A directory stores a home folder of the user, where folders and files in the home folder are available at a root of the internet file system. The application provides a first folder and a second folder in a root of the home folder. The first folder contains folders that represent folders and files that have been shared with the user, and the second folder contains objects of the user and communities that are of interest to the user. The application further creates an auxiliary class containing a first attribute, a second attribute, and a third attribute. The first attribute is used to quickly find other users that the folders and the files in the home folder have been shared with, the second attribute is used to store names of the other users and a path of the folders and the files that have been shared with the user, and the third attribute is used to allow the user and other users with common interests to share folders and files of the common interest.

In another attribute, a first user shares a file with a second user. An application adds the first user to a third attribute of the second user and adds the second user to a third attribute of the first user. The application further adds a path of the shared file and a user name of the second user to a first attribute of the first user and adds the path of the shared file and a user name of the first user to a second attribute of the second user. The application makes the first attribute available through a folder of the second attribute, where the folder belongs to the second user.

In a further attribute, user objects are created in a directory when, if a user shares a folder with another user who is not registered with an application in the directory, a temporary user object is created with an email address as the name of the other user. The other user submits a registration form and a script determines if the email address corresponds with the another user. If it does, the temporary user object is updated based on information provided in the registration form.

DETAILED DESCRIPTION

Figure 1:
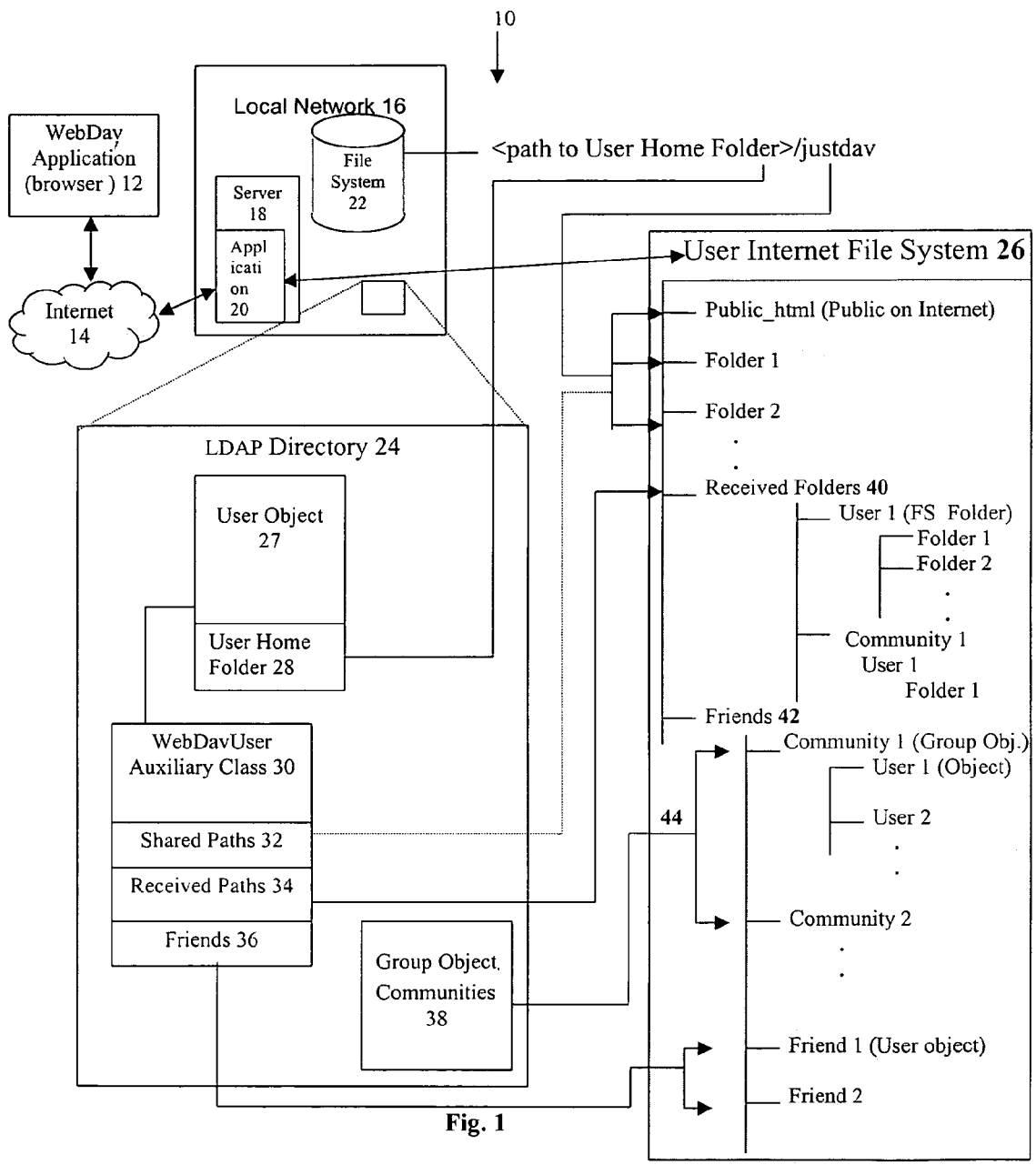
FIG. 1 depicts a diagrammatic view of a network and user internet file system of the present disclosure.

FIG. 1 depicts a network 10 that includes a local network 16 which is accessed by a WebDAV enabled application (or browser) 12 via the Internet (or data network) 14. The local network 16 includes a server 18 that comprises an application 20 for creating an Internet file system 26 that a user can access, a file system 22, and a directory 24 which may be a Lightweight Directory Access Protocol (LDAP) directory. The directory 24 includes a user's home folder 28 (which is an attribute of the user object), a WebDAVUser auxiliary class 30 and communities 38 (the group objects are an embodiment of the communities). The directory may be a Lightweight Directory Access Protocol based directory. The root of the Internet file system 26 is roughly equivalent to the user's home folder 28. The files and folders in the user's home folder 28 are available at the root of the user's Internet file system 26. The application 20 also provides two special folders in the root of the user's Internet file system. These are the Received Folders folder 40 (i.e. the first folder), and the Friends folder 42 (i.e. the second folder). The actual name of these folders is configurable and the scope of the invention should not be limited to any specific "name" assigned to these folders. Files in the user's Internet file system 26 are stored on the file system 22, with additional folders and shared files being stored in the directory 24 using the WebDAV user auxiliary class 30. An example of the directory 24 is Novell's eDirectory.

The Received Folders folder 40 contains folders that represent files and folders that have been shared with the user. For each user that has shared files or folders, there is a folder that includes the name of each user and the files or folders that have been shared. Also there are folders for each community that the user is a member of and in the community folder, there are folders for the other users that are in the community. This folder includes the files and folders that have been shared with the community.

The Friends folder 42 contains the user's objects and community folders that are of interest to the user. Anytime a folder is shared with another user, user objects are added to the Friends folder 42 for both the user sharing the folder and the user receiving the folder (i.e. the another user). This creates a repository of user objects and eliminates the need for performing a search in the directory 24 to find a user that someone may want to share files or folders with. The application 20 creates the WebDAVUser auxiliary class 30. The WebDAVUser is attached to a user object 27 when files are shared with that user, or when that user shares files with another user.

Included in the User Internet file system 26 are Communities 44 which are collections of users with a common interest. Files and folders can be shared between the suer and other users or with the whole community. Communities 38 are stored as groups in the directory 24 and the users are members of the group.

The application 20 also creates an auxiliary class 30 for the user of the application. The auxiliary class contains three attributes: Shared Paths 32, Received Paths 34, and Friends 36.

The Shared Paths attribute 32 is used to quickly find which users a file or folder has been shared with. This enables a user to modify the rights granted or to remove the sharing of the file or folder. The Received Paths attribute 34 is used to store the names of users and the path of the file or folder that have been shared with the user. The Received Folder 40 is populated using the information stored in this attribute.

Figure 2:
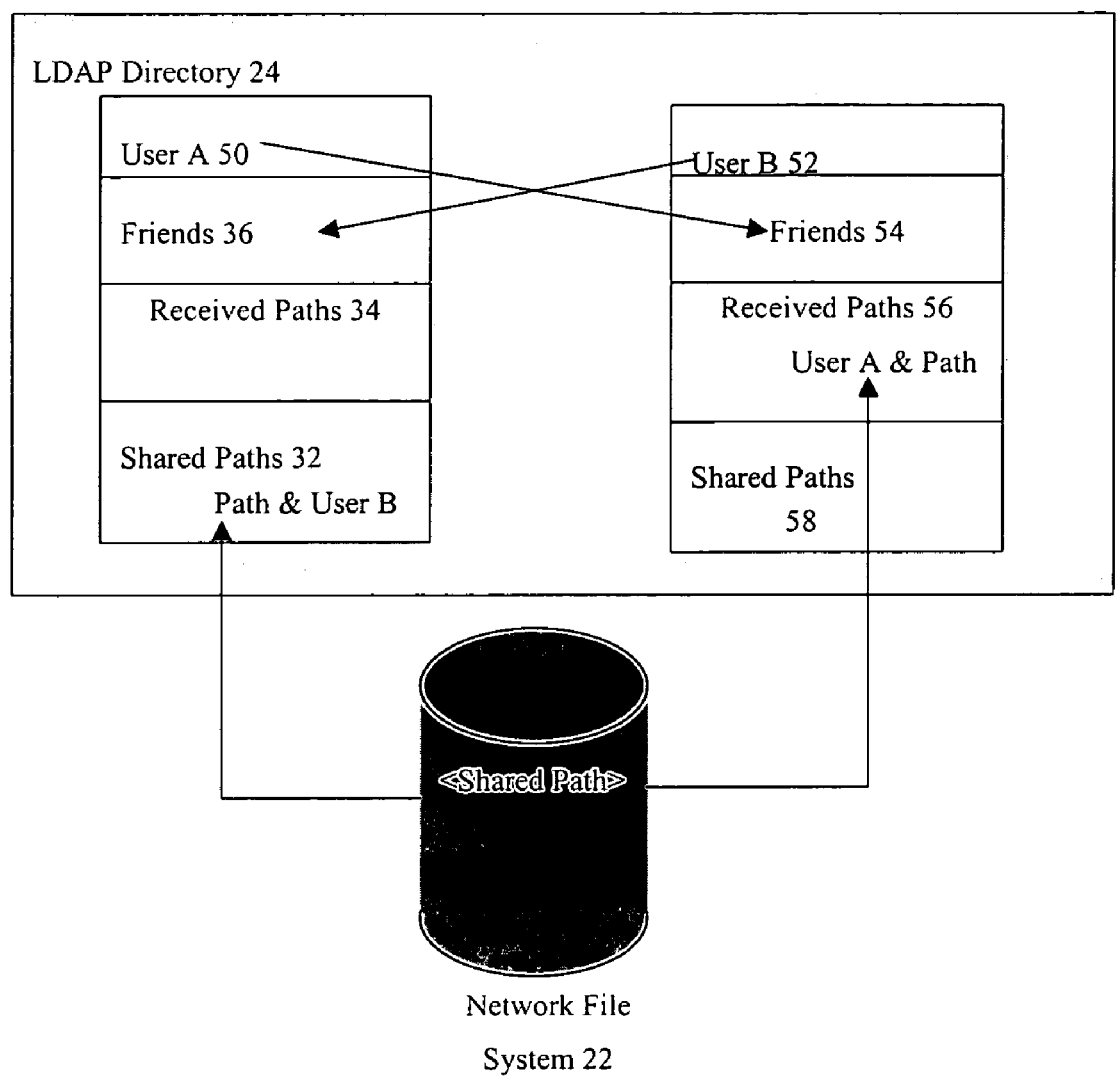
FIG. 2 depicts a diagrammatic view of sharing files and/or folders in a directory of the network of the present invention.

FIG. 2 depicts the sharing of files and/or folders in the directory 24. If User A 50 shares a file with User B 52, the application 20 adds User A to User B's Friends attribute 54, then adds User B to User A's Friends attribute 50. This puts the user objects 27 into the Friends folder 42 of the Internet file system 26, making the user objects readily available for future sharing.

The application 20 further adds the Path:User B key-value pair to User A's Shared Paths attribute 32 and adds the User A: Path key-value pair to User B's Received Paths attribute 56. The shared path via the network file system 22 will now be available through User B's Received Paths folder such as folder 40.

If User A 50 modifies rights to the shared path, the application 20 looks at the Shared Paths attribute 32 for User A to determine who the folder has been shared with and looks at the file system's Access Control Lists (ACLs) to determine what rights each user has been granted. The ACL is a list of users and the rights they have to a file. In a preferred embodiment, the ACLs that are used are built into the file system, where as the typical Internet file sharing system would need to store these ACLs in a database. As such, the ACLs described above determine what access rights User B has to the file shared by User A. When User A modifies the access rights, the application 20 modifies the ACLs. A mail message is then generated that sends notification to User B 52 that a file has been shared with him.

Figure 3:
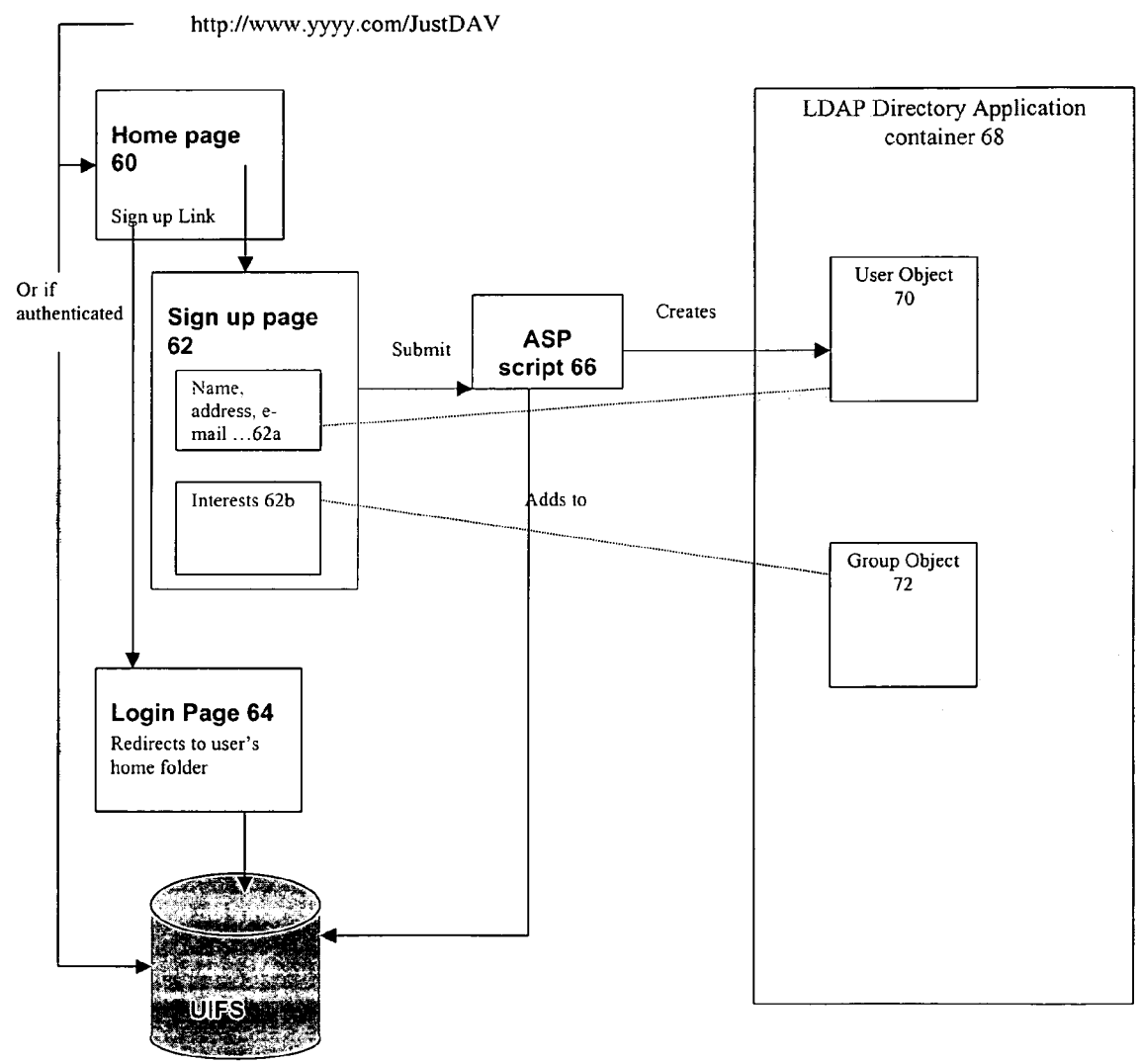
FIG. 3 depicts a diagrammatic view of creating users and communities in an application container of the directory of the present invention.

FIG. 3 depicts the creating of users and communities in the directory 24. The application 20 provides a system for creating new user objects in a directory container 68 which is similar to a folder in a file system as it can contain objects and other containers. If an un-authenticated user enters a web site to access the application 20, the user is presented with a home page 60 that contains a link to a sign up page 62 and to a login page 64. If the user is authenticated, he/she is taken straight to the root of their file system 22. The Sign up page 62 presents a form 62a (such as an HTML form) that receives information regarding the user such as: User name, Password, E-mail address, First Name, Last Name, Address, and Interests (such as Golf, Photography, and Skiing).

If a user shares a folder with another user who is not registered with the application 20, a temporary user object is created with the e-mail address as the name of the another user. When the sign up form is submitted, an ASP script 66 checks to see if the e-mail address entered corresponds with the temporary user. If it does, the user object is updated based on the new information provided. If there is no corresponding user object a new user object 70 is created with the information provided.

The ASP script 66 then looks at the Interests 62b that the user has entered. Each interest is associated with a Group object 72 in the application container 68 of the directory 24. For each interest the user denotes, the user is added as a member of that group. The groups that the user is associated with are then added to the users list of friends 42.

Figure 4:
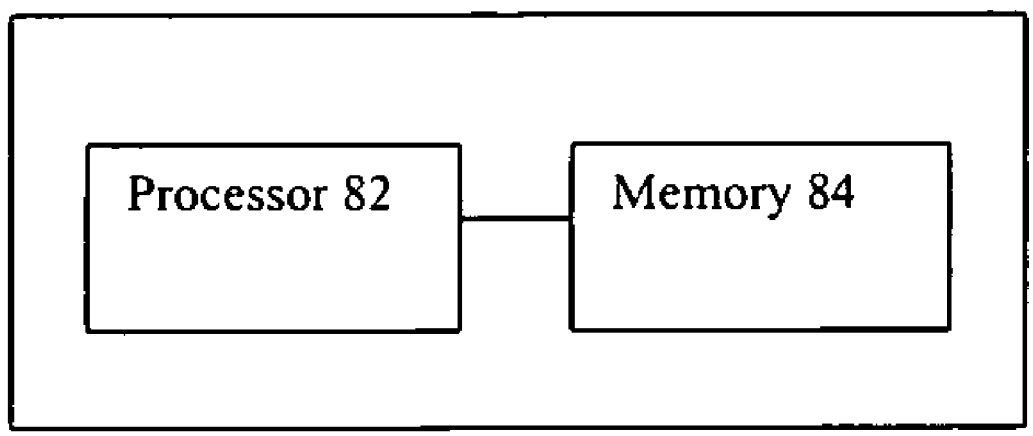
FIG. 4 depicts a computer of the present invention.

FIG. 4 depicts a computer 80 that includes a processor 82 that is operably coupled to memory 84. The computer 80 may be a personal computer, laptop, server, mobile phone, digital device, and/or any device that can send and/or receive information related to file sharing. The processor 82 may be a central processing unit, digital signal processor, microprocessor, microcontroller, microcomputer, and/or any device that manipulates digital information based on programming instructions. The memory 84 may be read-only memory, random access memory, flash memory and/or any device that stores digital information. The memory 84 is coupled to the processor 82 and stores a computer program (or software application) comprising instructions that, when executed on the computer (or read by the processor), causes the processor to perform the actions described in FIGS. 1–3 above.

The present disclosure thus enjoys several advantages. For example, a file system and directory are used in combination to allow an application that makes an Internet file system behave in a similar manner as a local or network file system. The application further administers rights for files in the file system and the directory is used for user account information. Also, communities of users may be configured to allow the users to easily share folders and files containing information of common interests.

It is understood that variations may be made in the foregoing without departing from the scope of the present invention. For example, the application 20 may reside on any digital device (such as a mobile phone) and be used in any network (such as a wireless network). It is further understood that other modifications, changes and substitutions are intended in the foregoing disclosure and in some instances some features of the disclosure will be employed without corresponding use of other features. Additionally, singular discussion of items and/or computers located in the network 10 is also meant to apply to situations where items and/or computers exist. Accordingly, it is appropriate that the appended claims be construed broadly and in a manner consistent with the scope of the disclosure.

What is claimed is:

1. A method to be performed in a computer system for configuring an internet file system, the method comprising:
    assessing, by a user, a server that is configured with an application;
    creating, by the application, an internet file system for the user;
    storing, by a directory, a home folder of the user, wherein folders and files in the home folder are available at a root of the internet file system;
    providing, by the application, a received folder and a friends folder in a root of the home folder, the received folder containing folders that represent folders and files that have been shared with the user, and the friends folder containing objects of the user and communities that are of interest to the user; and
    creating, by the application, an auxiliary class containing a shared path attribute, a received paths attribute, and a friends attributes, wherein the shared path attribute is used to quickly identify other users that the folders and the files in the home folder have been shared with, the received paths attribute is used to store names of the other users and a path of the folders and the files that have been shared with the user and to populate the received folder, and the friends attribute is used to allow the user and other users with common interests to share folders and files of the common interest.

2. The method of claim 1 further comprising accessing, by the user, the internet file system.

3. The method of claim 1 further comprising attaching the auxiliary class to a user object when the folders and the files are shared with the user.

4. The method of claim 1 further comprising enabling the user to modify granted rights to the shared folders and the shared files.

5. The method of claim 1 further comprising enabling the user to disallow the sharing of the folders and the files.

6. The method of claim 1 further comprising populating the first folder with the stored names of the other users and the path of the folders and the files that have been shared with the user.

7. The method of claim 1 further comprising creating communities of users with common interests, wherein the communities are stored as groups in the directory and the users are members of the groups.

8. A method for file sharing, the method comprising:
    creating, by the application, an auxiliary class containing a shared path attribute, a received paths attribute, and a friends attribute, wherein the shared path attribute is used to quickly identify other users that the folders and the files in the home folder have been shared with, the received paths attribute is used to store names of the other users and a path of the folders and the files that have been shared with the user, and the friends attribute is used to allow the user and other users with common interests to share folders and files of the common interest;
    sharing, by a first user, a file with a second user;
    in response to the file sharing by the first user, adding, by an application, the first user to the friends attribute of the second user;
    adding, by the application, the second user to the friends attribute of the first user;
    adding, by the application, a path of the shared file and a user name of the second user to the shared paths attribute of the first user;
    adding, by the application, the path of the shared file and a user name of the first user to the received paths attribute of the second user; and
    making available, by the application, the shared paths attribute through a folder of the received paths attribute, wherein the folder belongs to the second user.

9. The method of claim 8 further comprising, if the first user modifies rights to the shared paths attribute, determining by the application which user the folder has been shared with and what rights the user has been granted.

10. The method of claim 8 further comprising notifying the second user, by the application, that the file has been shared with the second user.

11. The method of claim 8 further comprising placing, by the application, objects of the first user and the second user into a folder of the attribute that is located in an internet file system of the first user and in an internet file system of the second user.

12. The method of claim 11 further comprising sharing the objects by the first user and the second user.

13. The method of claim 8 wherein the shared paths attribute, the received paths attribute, and the friends attribute are located in a directory.

14. The method of claim 8 wherein the first user has a received paths attribute and the second user has a shared paths attribute.

15. A method for creating user objects in a directory, the method comprising:
    creating, by the application, an internet file system for a user;
    providing by the application, a received folder and a friends folder in a root of a home folder of the user, the received folder containing folders that represent folders and files that have been shared with the user, and the friends folder containing objects of the user and communities that are of interest to the user; and
    creating, by the application, an auxiliary class containing a shared path attribute, a received paths attribute, and a friends attribute, wherein the shared path attribute is used to quickly identify other users that the folders and the files in the home folder have been shared with, the received paths attribute is used to store names of the other users and a paths of the folders and the files that have been shared with the user and to populate the received folder, and the friends attribute is used to allow the user and other users with common interests to share folders and files of the common interest;
if the user shares a folder with another user who is not registered with an application in the directory, creating a temporary user object with an email address as a name of the another user;
submitting, by the another user, a registration form;
determining, by a script, if the email address corresponds with the another user; and
if the email address corresponds with the another user, updating the temporary user object based on information provided in the registration form, else do not update the temporary user object.

16. The method of claim 15 further comprising, if there is no corresponding user object, creating a new user object based on the information provided.

17. The method of claim 15 further comprising monitoring, by the script, interests the another user has submitted in the registration form.

18. The method of claim 17 further comprising associating each interest of the another user with a group object in a container of the application.

19. The method of claim 18 further comprising adding the another user as a member of each interest group.

20. The method of claim 19 further comprising adding the each interest group to a list of friends of the another user.

21. The method of claim 15 wherein the information includes at least one item from a group consisting of:
the email address;
a user name;
a password;
a first name;
a last name;
an address; and
interests.

22. A system for configuring an internet file system, the system comprises:
a server configured with an application, wherein a user accesses the application and the application creates an internet file system for the user;
a directory that stores a home folder of the user, wherein folders and files in the home folder are available at a root of the internet file system, wherein the application further provides a plurality of folders in a root of the home folder, and wherein the application further creates an auxiliary class containing a plurality of attributes;
wherein the plurality of folders provided by the application includes a received folder containing folders that represent folders and files that have been shared with the user, and a friends folder containing objects of the user and communities that are of interest to the user; and
wherein the plurality of attributes created by the application includes a shared paths attributes used to quickly find other users that the folders and the files in the home folder have been shared with a received paths attribute used to store names of the other users and a path of the folders and the files that have been shared with the user, and a friends attribute used to allow the user and other users with common interests to share folders and files of the common interest.

23. A system for file sharing, the system comprising:
means for creating for each user, by an application, an auxiliary class containing a shared path attribute, a received paths attribute, and a friends attribute, wherein the shared path attribute is used to quickly identify other users that the folders and the files in the home folder have been shared with the received paths attributes is used to store names of the other users and a path of the folders and the files that have been shared with the user, and the friends attribute is used to allow the user and other users with common interests to share folders and files of the common interest;
means for sharing, by a first user, a file with a second user;
means for adding, by the application, the first user to the friends attribute of the second user in response to the file sharing by the first user;
means for adding, by the application, the second user to the friends attribute of the first user;
means for adding, by the application, a path of the shared file and a user name of the second user to the shared paths attribute of the first user;
means for adding, by the application, the path of the shared file and a user name of the first user to the received paths attribute of the second user; and
means for making available, by the application, the shared paths attribute through a folder of the received paths attribute, wherein the folder belongs to the second user; and
a processor for executing said means.

24. A user internet file system comprises:
a data storage device;
a directory that stores a home folder of a user, wherein folders and files in the home folder are available at a root of the internet file system, wherein an application further provides a plurality of folders in a root of the home folder, and wherein the application further creates an auxiliary class containing a plurality of attributes;
wherein the plurality of attributes comprises:
a shared paths attribute used to quickly find other users that the folders and the files in the home folder have been shared with;
a received paths attribute used to store names of the other users and a path of the folders and the files that have been shared with the user;
a friends attribute used to allow the user and other users with common interests to share folders and files of the common interest;
wherein the plurality of folders comprises:
a received folder, populated using the information stored in the received paths attribute, so that it contains folders representing files and folders that have been shared with a user and the names of those who shared the files and folders with the user; and
a friends folder that contains the user's objects and community folders that contain information that are of interest to the user.

25. The file system of claim 24 further comprises a root similar to a home folder of the user.

26. The file system of claim 25 wherein files and folders in the home folder are available at the root of the file system.

27. A directory stored in a file system, comprises:
a user object;
a home folder of the user, wherein the home folder is an attribute of the user object, the home folder further comprises a received folder that contains folders representing files and folders that have been shared with the user and the names of those who shared the files and folders with the user; and a friends folder that contains the user's objects and community folders that contain information that are of interest to the user;

an auxiliary class being attached to the user object in response to files being shared with the user;

wherein the auxiliary class comprises a plurality of attributes which includes a shared paths attribute used to quickly find other users that the folders and the files in the home folder have been shared with, a received paths attribute used to store names of the other users and a path of the folders and the files that have been shared with the user, and a friends attribute used to allow the user and other users with common interests to share folders and files of the common interest;

a community folder that includes topics of interest to the user; and a group object associated with each topic of interest.

28. The directory of claim 27 wherein the auxiliary class is attached to the user object when the user shares files with other users.

29. A computer-readable storage medium having instructions encoded thereon, the instructions comprising:

creating a user internet file system;

providing files in a root of a user's home folder;

providing a received folder and a friends folder in a root of the home folder, the received folder containing folders that represent folders and files that have been shared with the user, and the friends folder containing objects of the user and communities that are of interest to the user; and creating an auxiliary class attached to an object of the user if the files are shared via the internet file system, wherein the auxiliary class further comprises a shared paths attribute used to quickly find other users that the folders and the files in the home folder have been shared with, a received paths attribute used to store names of the other users and a path of the folders and the files that have been shared with the user, and a friends attribute used to allow the user and other users with common interests to share folders and files of the common interest.

* * * * *